(No Model.) 2 Sheets—Sheet 2.

P. LITTER & H. L. VANDRE.
SEPARATOR AND AMALGAMATOR.

No. 584,080. Patented June 8, 1897.

Witnesses,

Inventors,
Peter Litter
Hippolyte L. Vandre
By Dewey & Co. Attys

UNITED STATES PATENT OFFICE.

PETER LITTER AND HIPPOLYTE L. VANDRE, OF SAN FRANCISCO, CALIFORNIA.

SEPARATOR AND AMALGAMATOR.

SPECIFICATION forming part of Letters Patent No. 584,080, dated June 8, 1897.

Application filed December 14, 1896. Serial No. 615,649. (No model.)

*To all whom it may concern:*

Be it known that we, PETER LITTER and HIPPOLYTE L. VANDRE, citizens of the United States, residing in the city and county of San Francisco, State of California, have invented an Improvement in Separators and Amalgamators; and we hereby declare the following to be a full, clear, and exact description of the same.

Our invention relates to a process and apparatus which is especially designed for the separation of gold from black sand or other heavy material with which it may be found associated.

The invention consists in the parts and the construction and combination of parts hereinafter described and claimed.

Figure 1:
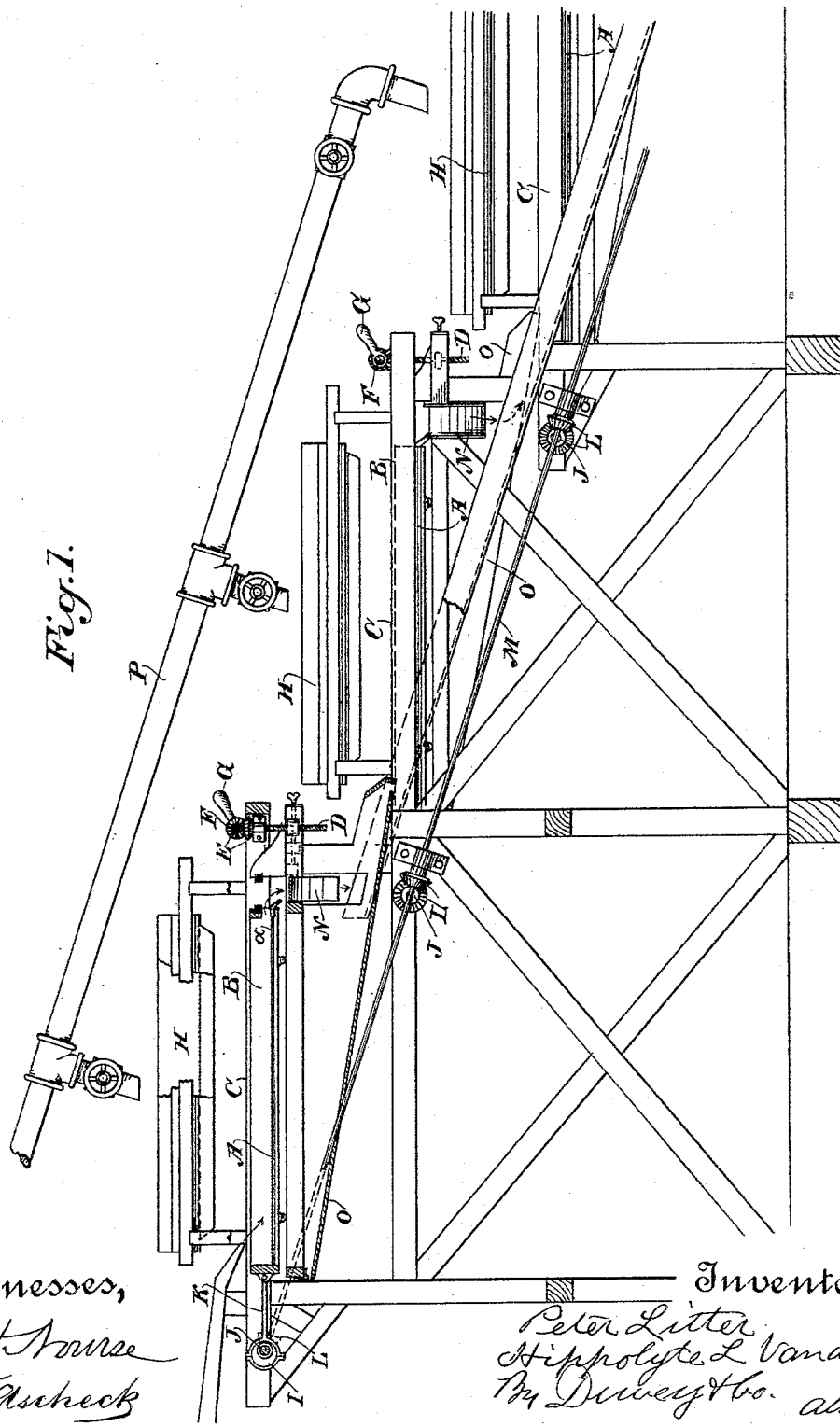
Figure 2:
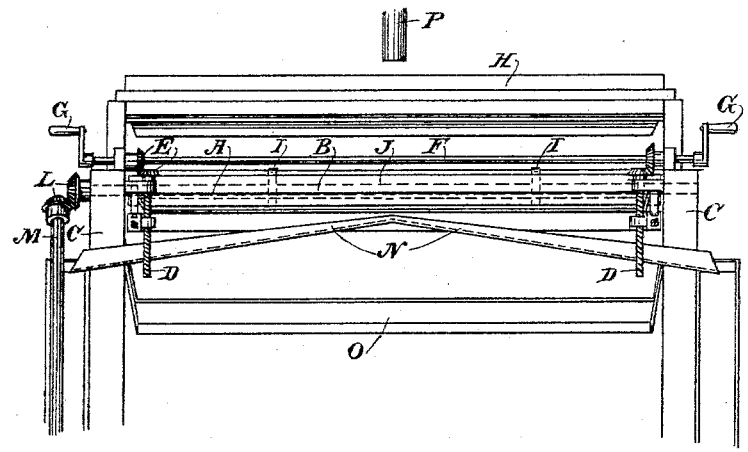
Figure 3:
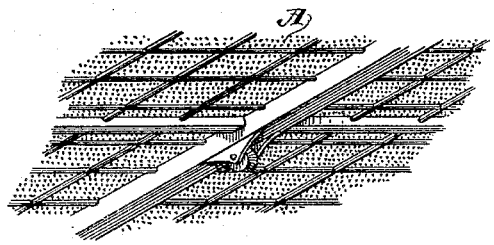

Figure 1 is a side elevation of our apparatus, the upper separator being shown in section. Fig. 2 is a front view of one of the series of separators and amalgamators. Fig. 3 is a bottom view of one of the screens, showing the manner of supporting the same by means of a strong open-wire screen.

Where gold is found associated with the heavy black sand and iron, as is the case in many sections, the greater portion of the gold is in the form of thin light scales, and while an oscillating or shaking apparatus operating in the usual manner will allow any heavy particles of gold to settle to the bottom beneath the sand the larger quantity, which consists of these thin scales, will remain upon the top and will naturally be discharged and lost with the sand. Our invention is designed to overcome this difficulty, and in carrying it out we employ a series of screens A of any suitable or desired size. These screens are arranged to be supported upon frames B, which are in turn supported upon a single main frame C, this latter frame having its upper surface inclined at such an angle in the direction of its length that the supplemental frames B and their screens, being arranged successively upon the frame C, will each be sufficiently lower than the next preceding one to receive such portion of its contents as it is desired to have carried on to the succeeding table.

The screen of the first section will be of such fineness as to separate out a certain portion of the larger grains of sand which remain upon the screen and will be carried by an oscillating or shaking motion, so as to be eventually delivered over the discharge end thereof and into receiving-chutes, and the second section will have a screen of somewhat finer mesh, in which the sand and valuable material are again separated, and so on to the end of the apparatus. These screens are so mounted that their discharge ends are supported upon vertically-movable screws D, passing through nuts fixed upon the movable portion of the frame. These screws are turnable simultaneously by means of beveled gears E upon the upper ends of the screws and upon a horizontal shaft F, this shaft having a crank or cranks G at the ends by which it may be turned, and this shaft being turned in one direction will act to elevate the screws and the end of the screen-frame, and turned in the other direction will depress them, the movement being the same for each side, so that the angle at which the screens stand may be perfectly adjusted.

Above the screens are situated the water-tanks H, having foraminous bottoms which serve as sprinklers, through which the water is allowed to pass in a fine rain, so as to fall by gravitation directly upon the screens beneath.

The screens are given an oscillating or shaking motion by means of eccentrics I, mounted upon shafts J and having eccentric-straps with rods K, connecting them with the ends of the screens.

Upon the outer ends of the shafts J are beveled gears L, one of which is upon this shaft and the other upon a shaft M, journaled parallel with the machine. This latter shaft may be the source of power by which all of the eccentric-shafts are driven, or, if preferred, the latter shafts may be driven by independent belts or other connections, the operation being essentially the same. These shafts are driven at such a rate as to produce a sufficiently-rapid oscillation of the screen-frames to keep the sand in constant agitation, while the rain of fine spray falling upon it beats the finer sand and thin scales of gold through the meshes of the screen.

As we have shown, the chute is made in two sections declining from about the middle of the machine each way and discharging entirely outside. A space of approximately six inches forms a perforated extension a of the screen to the discharge end, so that the water which falls upon this portion of the machine serves to carry the sand which has not passed through the screen into the discharge trough or chute. That portion of the sand and gold which passes through the screen will fall upon a plate O, situated beneath. This plate is preferably a silvered or amalgamated plate standing at such an incline that the material falling upon its surface will either be amalgamated thereon or will flow down and be discharged upon the second screen-section, which is next adjacent to the one just described. The operation upon this second screen-section will be essentially the same as that described for the first, and as the screen is finer than the first an additional portion of the sand will be separated out and discharged, that which remains with the heavy and the scale gold being again forced through the screen by the rain of fine spray falling upon it from the water-tank above. This again is received upon another amalgamated plate O, and is by it delivered to a third and still finer screen, as previously described. Thus as many series or sections may be employed as found necessary, the coarser and the finer material being separated from each other by successive operations until so little sand remains that any gold which has not been caught upon the upper amalgamated plates O can be most certainly caught upon a final amalgamated plate over which the remnant is allowed to flow after leaving the last screen.

The supply of water for the tanks H is derived from a pipe P, extending above the tanks, having suitable valves or cocks by which the flow is regulated.

Having thus described our invention, what we claim as new, and desire to secure by Letters Patent, is—

An apparatus for separating both light and heavy particles of gold simultaneously from sand with which they are associated, the same consisting of shaking-screen surfaces disposed at different levels one in advance of the other and all pointing in the same direction, and upon which the sand and gold are distributed in thin strata, said screen-surfaces having perforations of successively-decreasing areas from first to last whereby a separation occurs in each screen, means connected with one portion of the screen for shaking it, vertically-mounted screws on opposite sides of the other portion of the screens and having gears upon their upper ends, and a shaft having like gears whereby the inclination of the screens may be varied, means for discharging water from a height above, in a fine shower vertically upon each screen and its contents, whereby the gold and sand which are too fine to pass over the screen are driven through it, a discharge-chute for each screen, inclined from its center toward each side for delivering the coarse sand to the sides of the machine, and an inclined amalgamated plate under each screen and upon which the material that falls through the screen is received and over which it passes to the next adjacent screen.

In witness whereof we have hereunto set our hands.

PETER LITTER.
HIPPOLYTE L. VANDRE.

Witnesses:
DAVID HUGHES,
GIOVANNI B. BINORAX.